(12) United States Patent
Scarborough

(10) Patent No.: US 8,565,263 B2
(45) Date of Patent: Oct. 22, 2013

(54) DYNAMIC ADJUSTMENT OF BANDWIDTH FOR PROVIDING INCREASED BANDWIDTH DURING BUSINESS HOURS

(75) Inventor: Charles Scarborough, Marietta, GA (US)

(73) Assignee: Cox Communications, Inc., Atlanta, GA (US)

(*) Notice: Subject to any disclaimer, the term of this patent is extended or adjusted under 35 U.S.C. 154(b) by 298 days.

(21) Appl. No.: 12/824,689

(22) Filed: Jun. 28, 2010

(65) Prior Publication Data

US 2011/0317717 A1  Dec. 29, 2011

(51) Int. Cl.
*H04J 3/16* (2006.01)
*G06F 15/16* (2006.01)
*G06Q 10/00* (2012.01)
*H04N 7/16* (2011.01)
*H04N 7/173* (2011.01)
*H04B 1/66* (2006.01)

(52) U.S. Cl.
USPC ............... 370/468; 370/477; 709/203; 705/1; 725/29; 725/95; 375/240

(58) Field of Classification Search
USPC ......... 370/468, 259, 235, 389, 226, 338, 477; 709/203; 705/1; 724/29, 95; 375/240
See application file for complete search history.

(56) References Cited

U.S. PATENT DOCUMENTS

| | | | |
|---|---|---|---|
| 6,285,660 B1* | 9/2001 | Ronen | 370/259 |
| 7,768,920 B2* | 8/2010 | Goshen et al. | 370/235 |
| 2002/0016842 A1* | 2/2002 | Eki | 709/226 |
| 2007/0076711 A1* | 4/2007 | Shuster | 370/389 |
| 2008/0192773 A1* | 8/2008 | Ou et al. | 370/468 |
| 2009/0010233 A1* | 1/2009 | Pratt et al. | 370/338 |
| 2009/0178058 A1* | 7/2009 | Stillwell et al. | 719/317 |

* cited by examiner

*Primary Examiner* — Alpus H Hsu
*Assistant Examiner* — Anthony Luo
(74) *Attorney, Agent, or Firm* — Merchant & Gould

(57) ABSTRACT

Providing increased bandwidth to business subscribers during business hours. A determination is made whether a subscriber is eligible for application of a business boost. Business boost to the subscriber is activated when the subscriber is eligible for business boost. An increased bandwidth is provided to the activated subscriber during business hours to provide the business boost to the subscriber.

20 Claims, 7 Drawing Sheets

DYNAMIC ADJUSTMENT OF BANDWIDTH FOR PROVIDING INCREASED BANDWIDTH DURING BUSINESS HOURS

FIELD OF THE INVENTION

This disclosure relates in general to providing business telecommunications customers enhanced services, and more particularly to a providing dynamic adjustment of bandwidth for providing increased bandwidth to business subscribers during business hours.

BACKGROUND

On the Internet, many paths may exist between a given pair of nodes. The total message-carrying capacity (bandwidth) between two given nodes is the maximum amount of data per unit time that can be transmitted from one node to the other. Using a technique called packet switching, this data can be transmitted along several paths at the same time.

Service providers may provide their subscribers with various services including multimedia services by which subscribers obtain television and other multimedia content for viewing, data services such as Internet access, and telephony services including local, long distance, and/or video conferencing telephone services. In a bundled scenario, a provider may deliver two or more of these services to subscribers over an access network physical layer that is common to the bundled services.

However, applications and services continue to be developed to drive consumers demand for increases in Internet bandwidth. For example, the escalating popularity of social networking sites and the emergence of high-bandwidth applications, such as voice and video, act to increase consumer demand. Video downloads and transmissions are the most bandwidth intensive, wherein a video download may consume 8 to 10 times the bandwidth required for voice or music.

Further, products are increasingly becoming available to allow consumers to link their broadband audio, video, and data downloads to electronic devices and gadgets throughout their home. In a networked home, cable modems, digital video recorders (DVR), voice over IP (VoIP) systems, personal computers, and TVs are all linked. As each of the latest digital entertainment services come on line, the need for bandwidth further increases.

Businesses are demanding ever-increasing bandwidth in order to meet the high-speed communications requirements of today's fast-paced business world, especially as e-commerce becomes an important part of their everyday operations. Corporations, large and small, have always wanted to save time and money. And in the 21st Century, bandwidth is one of the most important factors driving a company's ability to compete efficiently and effectively in the global economy.

In contrast, bandwidth demand by home users tends to be concentrated after business hours. This is typically driven by homework demands, students communicating by email, twitter, facebook updates, listening to online music services, the downloading of on-demand videos and other services that are more focused on consumers.

Accordingly, consumer and business peak demand times are not coextensive and increases in business bandwidth allocation does not subtract from consumer bandwidth availability. Therefore, it can be seen that there is a need for providing dynamic adjustment of bandwidth for providing increased bandwidth to business subscribers during business hours.

SUMMARY OF THE INVENTION

To overcome the limitations described above, and to overcome other limitations that will become apparent upon reading and understanding the present specification, embodiments for providing dynamic adjustment of bandwidth for providing increased bandwidth to business subscribers during business hours is disclosed.

An embodiment includes a method that provides a dynamic adjustment of bandwidth for providing increased bandwidth to business subscribers during business hours. The method includes determining whether a subscriber is eligible for application of a business boost, activating business boost to the subscriber when the subscriber is eligible for business boost and provisioning an increased bandwidth to the activated subscriber during business hours to provide the business boost to the subscriber.

In another embodiment, a system for providing dynamic adjustment of bandwidth for providing increased bandwidth to business subscribers during business hours is disclosed. The system includes memory for storing data and a processor, coupled to the memory, wherein the processor is configured to determine whether a subscriber is eligible for application of a business boost, to activate business boost to the subscriber when the subscriber is eligible for business boost and to provision an increased bandwidth to the activated subscriber during business hours to provide the business boost to the subscriber.

In another embodiment, a system for providing dynamic adjustment of bandwidth for providing increased bandwidth to business subscribers during business hours is disclosed. The system includes a cable modem for providing a first bandwidth for communication of data across a network according to a first configuration file stored therein and a service provider, coupled to the cable modem, for providing the network and for controlling access to data across the network, the service provider further including a policy server for applying business rules for determining subscribers eligible for business boost and a bandwidth-on-demand server that controls bandwidth increases for eligible subscribers by providing the cable modem with a second configuration file to provide a second, increased bandwidth for providing business boost to the cable modem.

A computer readable medium including executable instructions which, when executed by a processor, provides a dynamic adjustment of bandwidth for providing increased bandwidth to business subscribers during business hours is disclosed. The computer readable medium includes instructions executable by the processor to determine whether a subscriber is eligible for application of a business boost, to activate business boost to the subscriber when the subscriber is eligible for business boost and to provision an increased bandwidth to the activated subscriber during business hours to provide the business boost to the subscriber.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to providing telecommunications business customers speed increases during business hours. Business customers who meet certain eligibility requirements will be able to experience increased bandwidths automatically.

Figure 1:
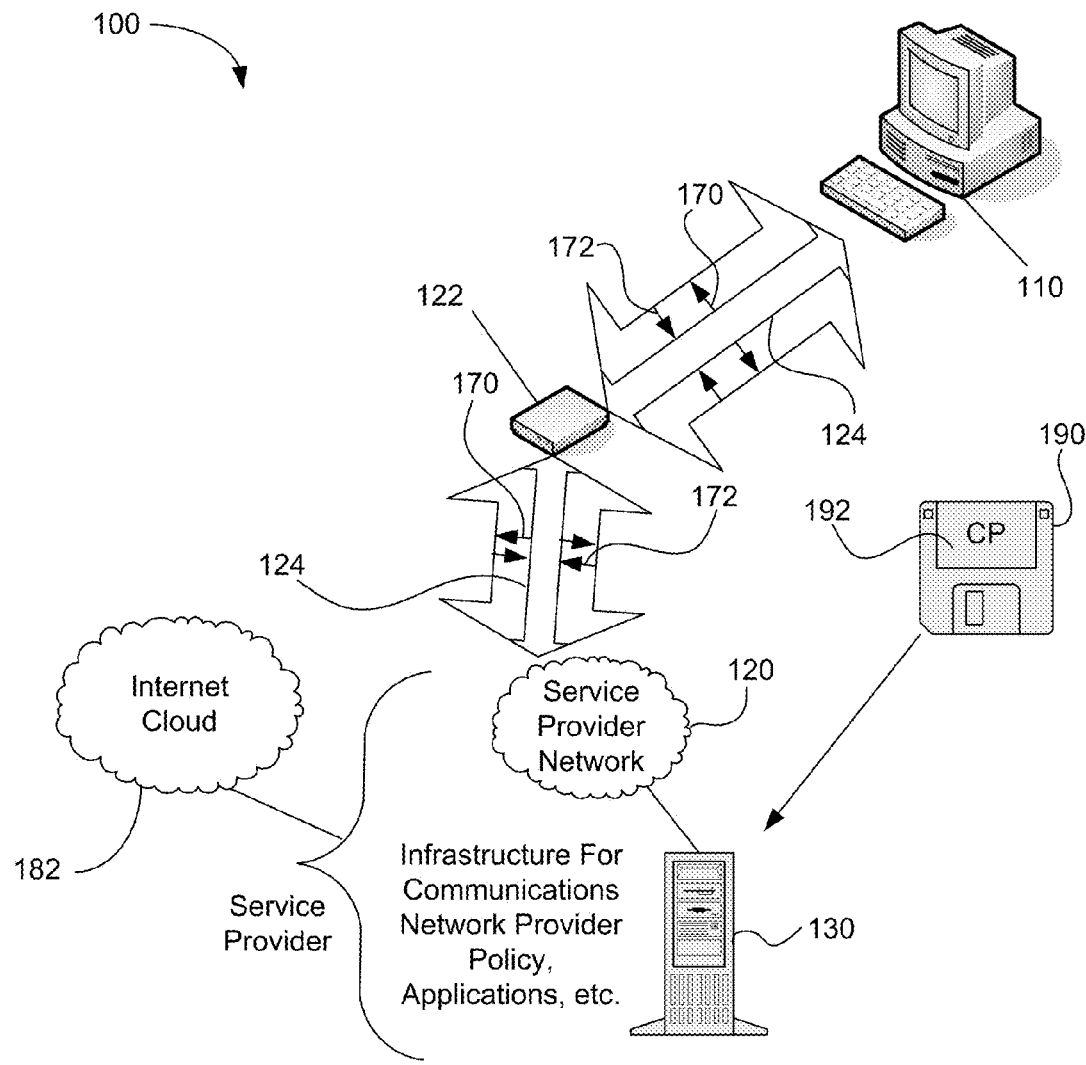
FIG. 1 illustrates a dynamic adjustment of bandwidth for providing increased bandwidth to business subscribers during business hours according to one embodiment.

FIG. 1 illustrates the dynamic adjustment of bandwidth for providing increased bandwidth to business subscribers during business hours 100 according to one embodiment. The business customer 110 connects to the service provider network 120 through modem 122. The service provider network platform 130 provisions services for business customer 110 and provides access to the Internet 182.

Business internet services have heretofore been provided on a best effort basis across several bandwidth tiers. However, using Packet Cable Multimedia via service provider network platform 130, enhanced services may be provided to deliver better experiences for the business customer 110. PCMM enables dynamic bandwidth allocation so that bandwidth may be increased during business hours and reverted back to the normal profile during off-hours.

In FIG. 1, customer 110 is provided a business boost 170, i.e., increase bandwidth during business hours. Business Boost (BB) allows business customer 110 that subscribes to predetermined tiers of service to have their speeds boosted during business hours. The bandwidth reverts back 172 to their contracted speeds 124 during off-business hours. Business Boost utilizes PacketCable™ Multimedia to create a time of day configuration profile for broadband speeds. For example, a business customer may have standard 6 Mb/1 Mb downstream/upstream profile. However, between the hours of 7:00 a.m. to 7:00 p.m. the speed profile of the business customer may be increased 170 to provide 12 Mb/2 Mb downstream/upstream bandwidth during business hours. The objective is to allow these customers to experience higher speeds across the network. This in turn creates brand loyalty and encourages upsell to our higher tiers. The business boost is also applicable to additional opportunities. For example, there is an opportunity to market the business boost as a voice/data bundle.

Business Boost may be implemented as a continuous service that is available year-round for business customers. The PCMM infrastructure and bandwidth-on-demand application servers via the service provider network platform 130 may be used to deliver the increased bandwidth during business hours.

Embodiments for providing an increased bandwidth during business hours (Business Boost) may be implemented in a suitable computing environment. Embodiments may also be implemented in combination with other types of computer systems and program modules. Generally, program modules include routines, programs, components, data structures, and other types of structures that perform particular tasks or implement particular abstract data types. By way of example, computer readable media 190 can include computer storage media and communication media. Computer storage media 190 includes volatile and nonvolatile, removable and non-removable media implemented in any method or technology for storage of information 192, such as computer readable instructions, data structures, program modules or other data.

Computer storage media 190 typically embodies computer readable instructions, data structures, program modules, etc. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in the communications network provider 120.

Embodiments implemented on computer-readable media 190 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 190 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device. As mentioned briefly above, a number of program modules and data files may be stored and arranged for controlling the operation of processing devices. Thus, processing devices, such as provided by the communications network provider 120, may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 2:
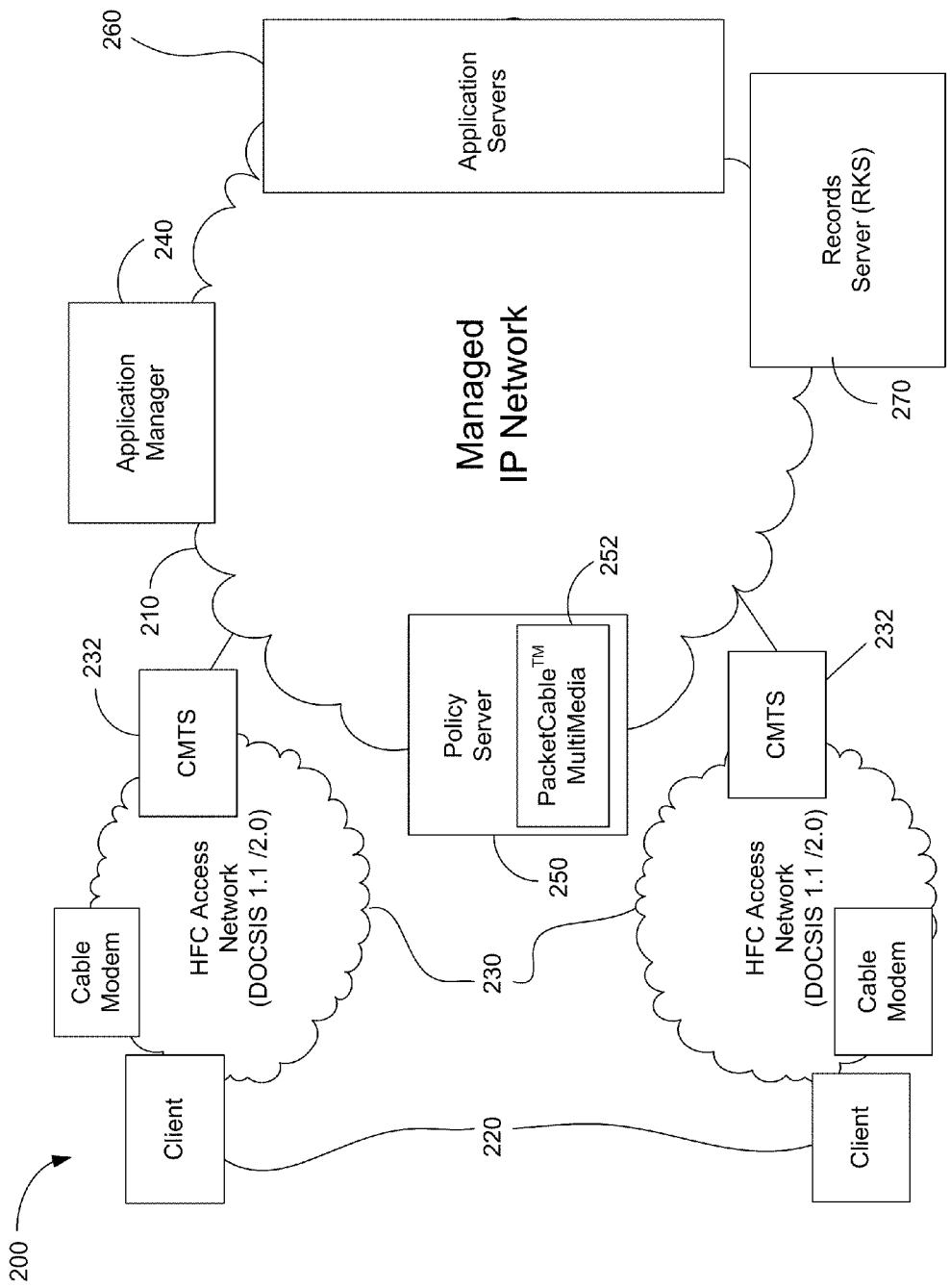
FIG. 2 is a block diagram showing PacketCable™ Multimedia network elements according to one embodiment.
Figure 3:
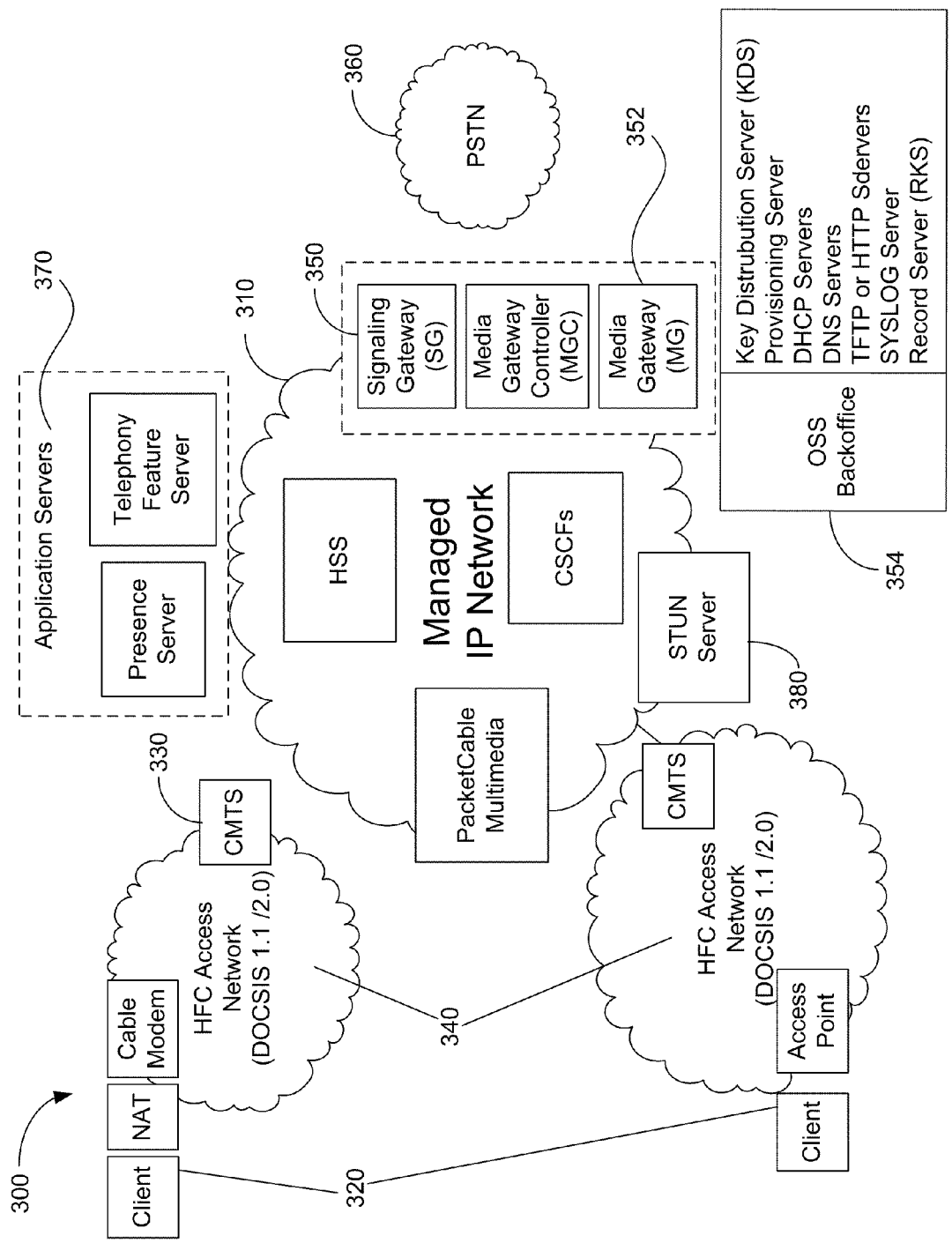
FIG. 3 is a block diagram illustrating another PacketCable™ architecture according to an embodiment of the invention.

FIG. 2 is a block diagram 200 showing PacketCable™ Multimedia network elements according to one embodiment. The PacketCable™ Multimedia specification defines an IP-based platform 210 for delivering QoS-enhanced multimedia services to the customer 220 over DOCSIS® access networks 230. The managed IP network 210 provides QoS authorization and admission control, event messages for billing and other back-office functions, and security to support a wide range of IP-based services beyond telephony. While the PacketCable™ architecture 200 may be configured to include provisioning of residential telephony services as shown in FIG. 3, the PacketCable™ Multimedia architecture 200 offers a general-purpose platform for cable operators to deliver a variety of IP-based multimedia services that require QoS management and control. The Application Manager 240 and Policy Server 250 authenticate subscribers and ensure that subscribers receive the required Quality of Service needed for any specific multimedia applications. Application Servers 260 host content and provide application services to Client devices 220.

PacketCable™ Multimedia 252 enables multiple application managers 240 to exist in a network. The application managers 250 must all use a pool of shared resources, e.g. HFC bandwidth, which can be made available by multiple devices. Thus, bandwidth requests are directed to a further intermediary device which mediates between the application manager 240 and the CMTS 232.

Mediation is provided by the policy server 250, which coordinates bandwidth for application managers and delivers the commitments necessary to the multimedia applications. In this manner, dynamic bandwidth allocation for providing business boost, i.e., increased bandwidth during business hours, to business clients 220. The Record Keeping Server 270 is responsible for accepting event messages, incorporating partial billing information into a single coherent record that describes the resources used during the service, and passing this information on to the billing system.

FIG. 3 is a block diagram 300 illustrating another PacketCable™ architecture according to an embodiment of the invention. The architecture 300 in FIG. 3 is configured to extend cable's existing Internet Protocol service environment to accelerate the convergence of voice, video, data, and mobility technologies. The architecture 300 is an application-agnostic architecture that is based on a common network core 310. The network core 310 is a set of network elements that use standard protocols to register clients 320 in the network and to establish sessions. The Cable Modem Termination System (CMTS) 330 provides communication between the DOCSIS® HFC Access Network 340 and the Managed IP Network 310. Both the Signaling Gateway (SG) 350 and the Media Gateway (MG) 352 provide communication between the Managed IP Network 310 and the PSTN 360. Applications servers 370 reside outside the core network for the delivery of enhanced residential and small/medium business digital voice services (including video telephony), and mobility services which also supports feature integration across service platforms according to an embodiment of the invention. The STUN Server 380 is required only when an SMA Gateway is behind a NAT device and needs to establish media sessions with other media clients that may or may not be behind NAT devices. The STUN server 380 determines one of several possible candidate media addresses using a predetermined protocol. A number of applications may utilize the PacketCable™ Multimedia core network, such as residential SIP telephony, cellular integration, business services, and HD voice.

The Cable Modem Termination System (CMTS) 330 is responsible for enforcing bandwidth related policy decisions, e.g., business boost. Again, business subscribers may be provided increased bandwidth during business hours. CMTS 330 performs admission control and manages HFC network resources through DOCSIS service flows. The CMTS 330 is based at the edge of the HFC network 340 and communicates with the policy servers and with the OSS Backoffice 354.

Figure 4:
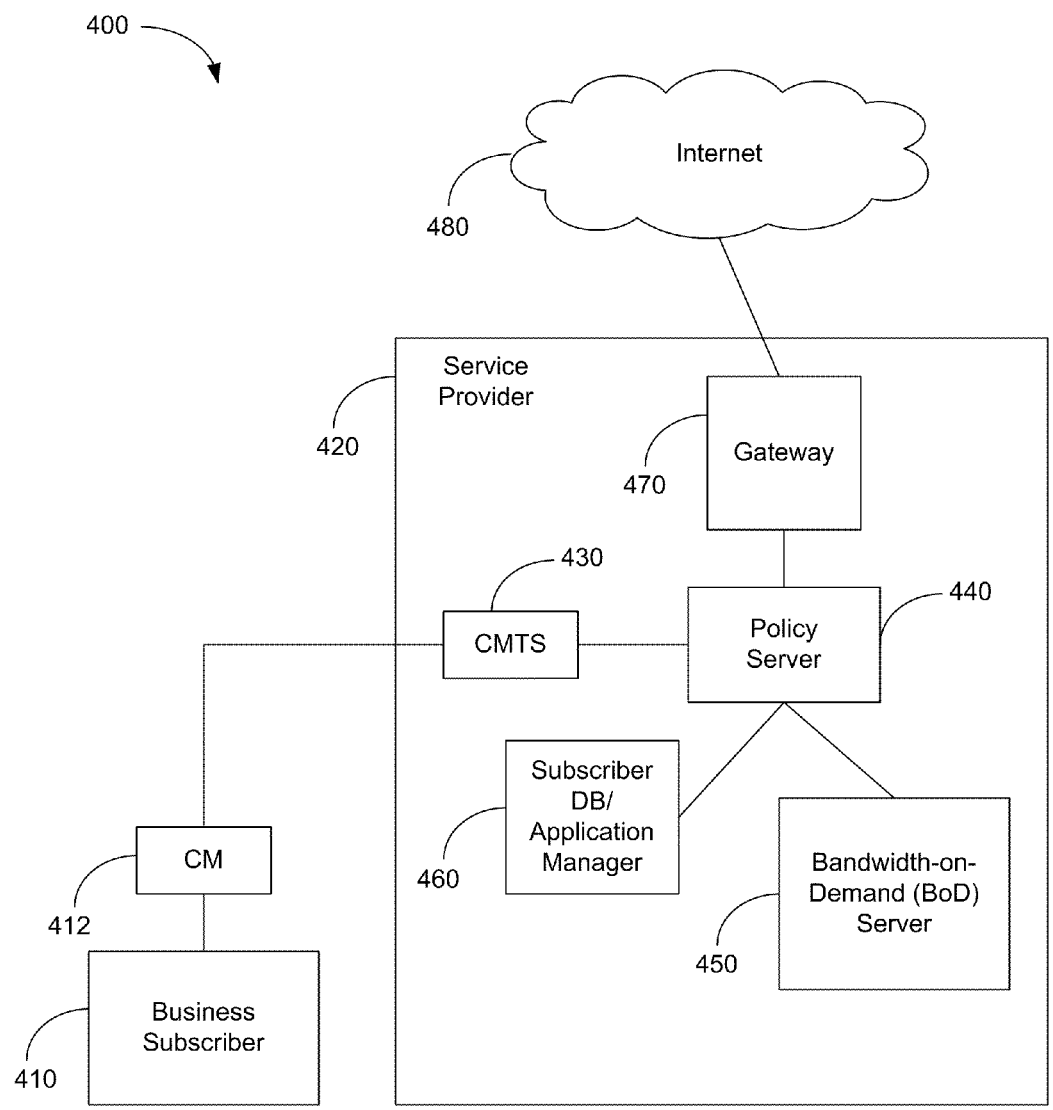
FIG. 4 illustrates a diagram of a system for providing telecommunications business customers speed increases during business hours according to an embodiment of the invention.

FIG. 4 illustrates a diagram of a system 400 for providing telecommunications business customers speed increases during business hours according to an embodiment of the invention. In FIG. 4, a business customer 410 is shown coupled to a cable modem (CM) 412. The cable modem 412 is coupled to a service provider 420. The service provider 420 may be a cable provider, a satellite television provider, a cellular communications company, a land-line telephone company, etc. The cable modem 412 receives from and sends signals to the service provider 420. Data from cable modem 412 is routed through the cable modem termination system (CMTS) 430. The CMTS device 430 performs admission control and manages network resources, e.g., through Data over Cable Service Interface Specifications (DOCSIS) service flows. The CMTS 430 is coupled to a policy server 440. The policy server 440 acts as a policy decision point and policy enforcement point and manages relationships between application managers and cable modem termination system (CMTS) devices 430. The policy server 440 delivers policy to CMTS 430 when a policy request is appropriate. The policy server 440 applies business rules that determine which customers, tiers and/or applications receive the appropriate bandwidth profile.

The policy server 440 communicates with a bandwidth-on-demand (BoD) server 450. The BoD server 450 controls bandwidth increases for individual customers as well as who is allowed network access.

The policy server 440 may be configured to route a request to the BoD server 450, which sends a new configuration file to the cable modem 412, thereby resetting the bandwidth level for the cable modem 412. However, for business boost, a script for the Business Boost (BB) service loads participating MAC addresses for business boost subscribers into the BOD server 450 at the start time and removes them at the stop time. The start time and the stop time may be configurable. Eligibility is determined by reviewing the MAC address, business Internet speed code and a new business boost code for participating customers, which may be provided by the records server 460, e.g., which may maintain a subscriber database and other applications.

The BOD server 450 provides the business boost code assigned for the business boost service that will be available for paying business customers. The business subscribers 410 are granted an increased bandwidth through gateway 470 to the Internet 480. Center tiers for both the 12/2 and the 10/1 profiles may use the same business boost code along with their existing service code for eligibility determinations. The business code in conjunction with the existing business Internet speed code may be used to trigger inclusion in the script.

Figure 5:
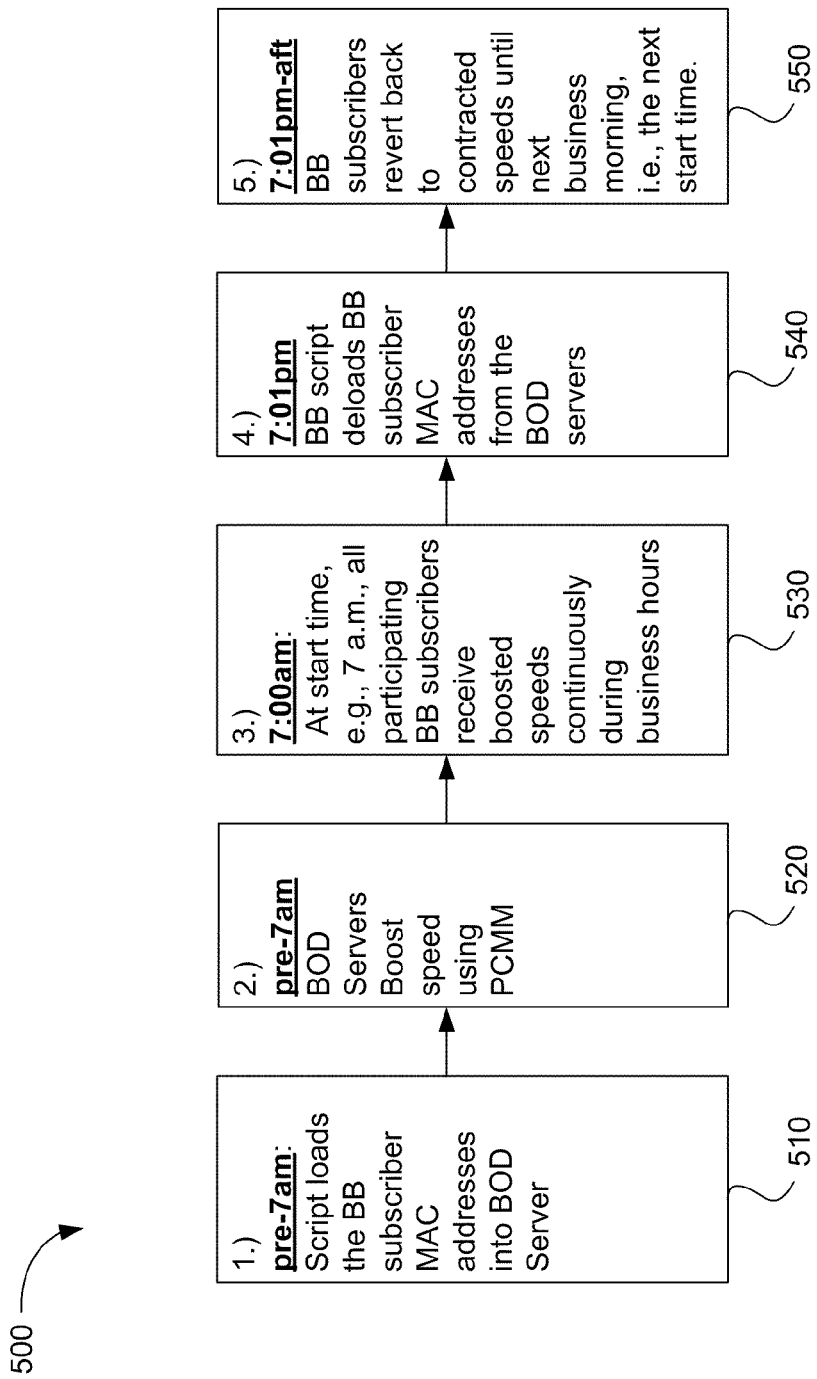
FIG. 5 is a flow chart of an implementation of business boost using PCMM according to an embodiment of the invention.

FIG. 5 is a flow chart 500 of an implementation of business boost using PCMM according to an embodiment of the invention. In FIG. 5, a script loads MAC addresses of participating business boost subscribers into a bandwidth-on-demand (BoD) server at prior to the 7 a.m. start time 510. The BoD server provides the increased bandwidth using PCMM 520. At 7:00 a.m., the business subscribers will experience the bandwidth boost continuously during business hours 530. At 7:01 p.m., the business boost script deloads the business subscriber MAC addresses from the BoD servers 540. At 7:01 p.m. until the next start time, the business boost subscribers revert back to contracted speeds 550.

In implementing the business boost, the network will need to support all business boost subscribers across time zones.

For example, subscribers may be distributed across time zones, wherein customers in the Pacific Region make up 20.6% of total subscriber base, customers in the Mountain Region make up 10.6% of total subscriber base, customers in the Central Region make up 41.6% of total subscribers, and customers in the Eastern Region make up 27.2% of total subscriber base. Thus, the network will need to support subscribers starting with the Eastern time zone at 7 a.m. EST and maintaining until 10 p.m. EST to cover the pacific region.

Subscribers may be rolled into the service without any customer notification or interruption to service. The subscribers are simply assigned the business boost service code prior to rollout. Thus, business boost subscribers will experience the higher speeds seamlessly during business hours without being required to select participation. After the initial implementation, new customers may be added according to the same basic steps that are used for business Internet services for subscribers. Lower tier customers may convert to a tier that provides for subscriptions to business boost services. The fulfillment of requirements will be implemented as whole across all markets versus being implemented on a market by market basis.

Accordingly, increased speeds may be configured to start at 7 a.m. and end at 7 p.m. Speeds revert back to contracted speeds between 7:01 p.m. to 6:59 a.m. the next business day. The process cycles through this arrangement. For example, a subscriber with 12/2 service is boosted to 24/4 during business hours starting at 7 a.m. At 7:01 p.m. the service of the 12/2 subscriber returns to 12/2. Only subscribers on the appropriate tiers and assigned to the business boost codes may participate.

Figure 6:
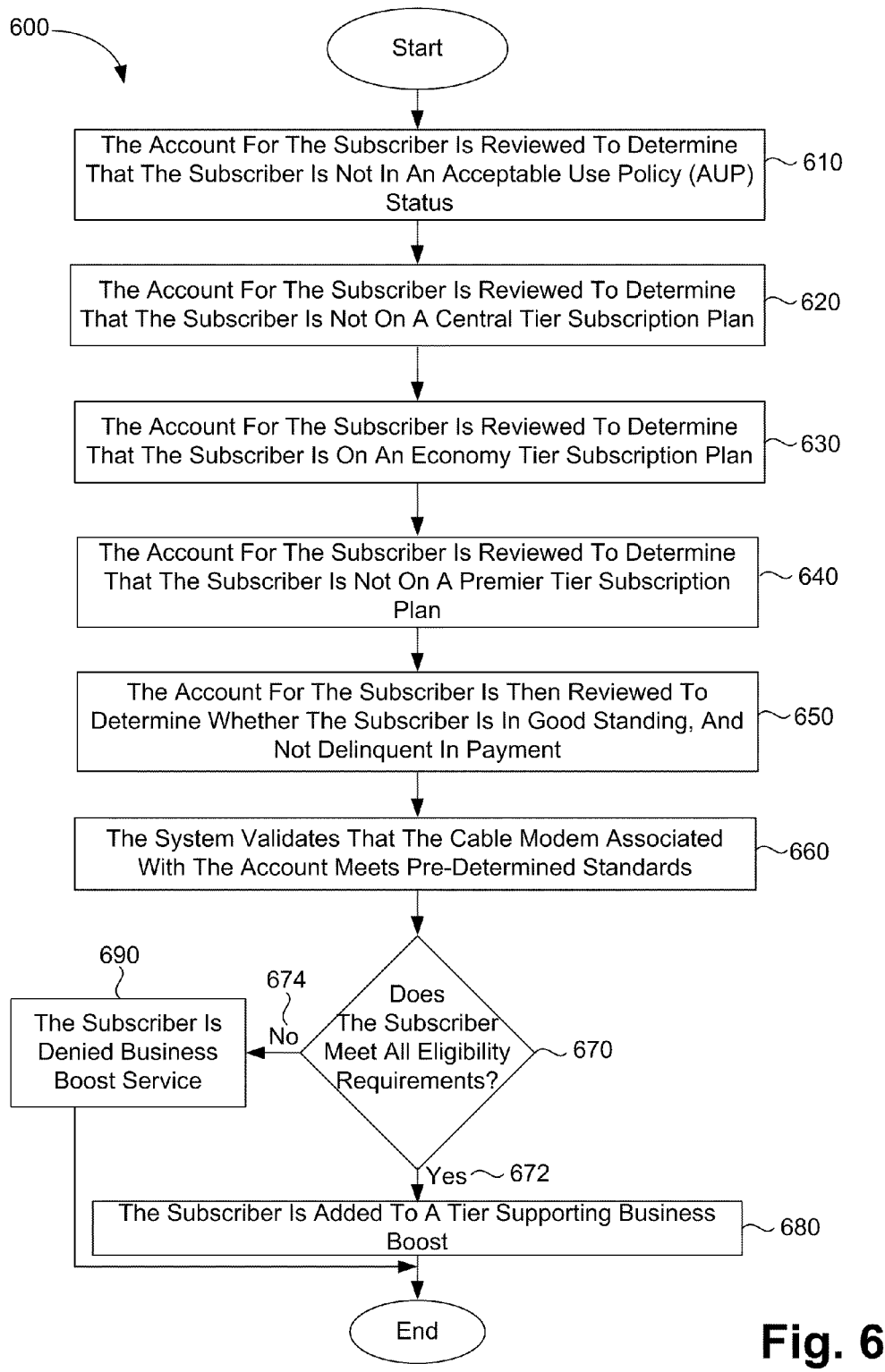
FIG. 6 is a flow chart for determining whether a subscriber is eligible for business boost according to an embodiment of the invention.

FIG. 6 is a flow chart 600 for determining whether a subscriber is eligible for business boost according to an embodiment of the invention. The account for the subscriber is reviewed to determine that the subscriber is not in an acceptable use policy (AUP) Status 610. The account for the subscriber is reviewed to determine that the subscriber is not on a central tier subscription plan 620. The account for the subscriber is reviewed to determine that the subscriber is on an economy tier subscription plan 630. If the subscriber is determined to be on an economy plan, an opportunity exist to upsell the subscriber to the central tier that supports business boost. Next, the account for the subscriber is reviewed to determine that the subscriber is not on a premier tier subscription plan 640. The account for the subscriber is then reviewed to determine whether the subscriber is in good standing, and not delinquent in payment 650. Thereafter, the system validates that the cable modem associated with the account meets pre-determined standards 660. A determination is made whether the subscriber met all eligibility requirements 670. If yes 672, the subscriber is added to a tier supporting business boost 680. Otherwise 674, the subscriber is denied business boost service 690.

The central tier upgrade activation is implemented in a pre-determined period of time. The subscriber is instructed to leave their computer on until they receive an email confirmation. The System will send an email to the primary account confirming that the central tier supporting business boost has been activated for their account.

The system updates the customer comment field of the billing system.

The System script dynamically increases the throughput of the cable modem for the account to a central service tier using the PacketCable™ Multimedia specification during the business hours specified. No modem reboot is necessary. The increased bandwidth provided to a central tier subscriber may be configured to still be less the capability of a premier tier subscriber. The System will maintain the higher speed for the duration of the business boost period each business day. This interval is maintained within the PCMM policy for business boost. The system script dynamically decreases the throughput of the cable modem, again without a modem reboot, to the contracted speeds for that central service tier using the PacketCable™ Multimedia specification at the end of the business boost period. For example, central tier subscribers are returned to normal central tier speeds at 7 p.m.; until the next start time.

With the rollout of higher speeds across the network periodically, business boost speeds may be dynamically modified with each of those speed enhancements. All future speed enhancements across the network must be reviewed to verify business boost at the new speed may be accommodated across the network. If the network cannot accommodate the business boost at the new speeds, the further increase will be modified to fit the network.

Figure 7:
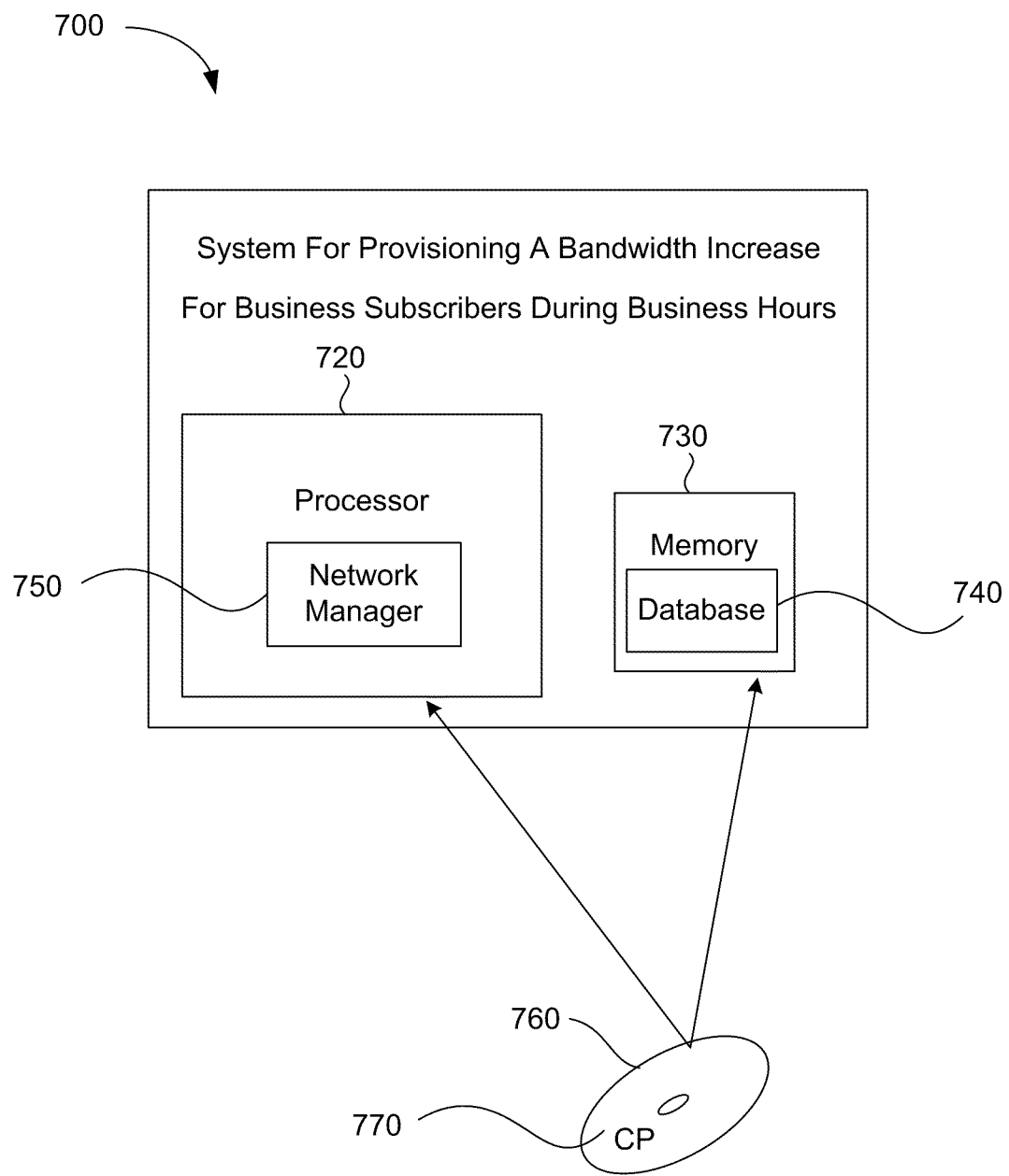
FIG. 7 illustrates a suitable computing environment for implementing a system as described above in FIGS. 1-6 according to an embodiment.

FIG. 7 illustrates a suitable computing environment 700 for implementing a system as described above in FIGS. 1-6 according to an embodiment. In FIG. 7, a system for providing dynamic adjustment of bandwidth for providing increased bandwidth to business subscribers during business hours 700 includes a processor 720 and memory 730. Embodiments may also be implemented in combination with other types of computer systems and program modules. Generally, program modules include routines, programs, components, data structures, and other types of structures that perform particular tasks or implement particular abstract data types. By way of example, computer readable media 790 can include computer storage media or other tangible media. Computer storage media 790 includes volatile and nonvolatile, removable and non-removable media implemented in any method or technology for storage of information 792, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 790 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 790 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 720 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 730 thus may store the computer-executable instructions that, when executed by processor 720, cause the processor 720 to implement a system as illustrated above in FIGS. 1-6 according to an embodiment of the invention. However, memory 730 may also be configured to provide a database 740 for storing information required for provisioning a bandwidth increase for business subscribers during business hours. A network manager 750 may be implemented by the processor 720 for monitoring and managing the high speed Internet network.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing increased bandwidth to business subscribers during business hours, comprising:
   providing a plurality of bandwidth tier subscription plans having a plurality of increasing bandwidths, wherein a subscriber has a first bandwidth tier subscription plan having a first bandwidth;
   determining whether the first bandwidth tier subscription plan is eligible for application of a business boost during business hours;
   if the first bandwidth tier subscription plan is not eligible for application of the business boost during business hours, upgrading the subscriber to a second bandwidth tier subscription plan supporting the business boost and having a second bandwidth; and
   if the subscriber is upgraded to the second bandwidth tier subscription plan supporting the business boost, activating business boost to the subscriber when the subscriber is eligible for the business boost during business hours and provisioning an increased bandwidth to the subscriber during business hours to provide the business boost to the subscriber,
   wherein activating business boost comprises: loading MAC address of the eligible subscriber into a bandwidth-on-demand server prior to a start time, scheduling the increased bandwidth to the eligible subscriber having the MAC address continuously during business hours, deloading the MAC address of the eligible subscriber from the bandwidth-on-demand server at a stop time, and re-scheduling the eligible subscriber having the MAC address deloaded back to the second bandwidth.

2. The method of claim 1, wherein activating business boost comprises setting the start time and the stop time for provisioning the increased bandwidth to the elgible subscriber.

3. The method of claim 2, wherein the setting the start time and the stop time further comprises setting the start time for the elgible subscriber to receive the increased bandwidth at 7:00 a.m. and setting the stop time for the elgible subscriber to revert back to contracted bandwidth at 7:00 p.m.

4. The method of claim 1, wherein the provisioning the increased bandwidth to the subscriber during business hours comprises provisioning the subscriber with a first downstream/upstream profile having the first bandwidth with the business boost to provide a second downstream/upstream profile having the second bandwidth during business hours, wherein the second bandwidth is greater than the first bandwidth.

5. The method of claim 1, wherein the provisioning the increased bandwidth further comprises applying the increased bandwidth to all business boost subscribers across all time zones where the elgible subscriber is located.

6. The method of claim 1, wherein the provisioning the increased bandwidth further comprises provisioning the increased bandwidth without any customer notification.

7. A system for providing increased bandwidth to business subscribers during business hours, comprising:
   memory for storing data; and
   a processor, coupled to the memory, wherein the processor is configured:
      to providing a plurality of bandwidth tier subscription plans having a plurality of increasing bandwidths, wherein a subscriber has a first bandwidth tier subscription plan having a first bandwidth,
      to determine whether the first bandwidth tier subscription plan is eligible for application of a business boost,
      if the first bandwidth tier subscription plan is not eligible for application of the business boost during business hours, to upgrade the subscriber to a second bandwidth tier subscription plan supporting the business boost and having a second bandwidth, and
      if the subscriber is upgraded to the second bandwidth tier subscription plan supporting the business boost, to activate the business boost to the subscriber when the subscriber is eligible for the business boost and to provision the increased bandwidth to the subscriber during business hours to provide the business boost to the subscriber,
      wherein activating business boost comprises: loading MAC address of the eligible subscriber into a bandwidth-on-demand server prior to a start time, scheduling the increased bandwidth to the eligible subscriber having the MAC address continuously during business hours, deloading the MAC address of the eligible subscriber from the bandwidth-on-demand server at a stop time, and re-scheduling the eligible subscriber having the MAC address deloaded back to the second bandwidth.

8. The system of claim 7, wherein the processor activates business boost by setting the start time and the stop time for provisioning the increased bandwidth to the subscriber.

9. The system of claim 8, wherein the processor sets the start time and the stop time by setting the start time for the subscriber to receive the increased bandwidth at 7:00 a.m. and by setting the stop time for the subscriber to revert back to contracted bandwidth at 7:00 p.m.

10. The system of claim 8, wherein the provisioning the increased bandwidth further comprises applying the increased bandwidth to all business boost subscribers across all time zones where the elgible subscriber is located.

11. The system of claim 8, wherein the provisioning the increased bandwidth further comprises provisioning the increased bandwidth without any customer notification.

12. A system for providing increased bandwidth to business subscribers during business hours, comprising:
a cable modem for providing a first bandwidth for communication of data across a network according to a first configuration file stored therein that is associated with a first bandwidth tier subscription plan having the first bandwidth; and
a service provider, coupled to the cable modem, for providing the network and for controlling access to data across the network, the service provider further including a policy server for applying business rules for determining whether the first bandwidth tier subscription plan is eligible for business boost during business hours and a bandwidth-on-demand server that controls bandwidth increases for an eligible subscriber by providing the cable modem with a second configuration file associated with a second bandwidth tier subscription plan supporting the business boost to provide a second, increased bandwidth during business hours for providing the business boost to the cable modem,
wherein providing the business boost comprises: loading MAC address of the eligible subscriber into the bandwidth-on-demand server prior to a start time, scheduling the increased bandwidth to the eligible subscriber having the MAC address continuously during business hours, deloading the MAC address of the eligible subscriber from the bandwidth-on-demand server at a stop time, and re-scheduling the eligible subscriber having the MAC address deloaded back to the first bandwidth.

13. The system of claim 12 further comprises a cable modem termination system device, coupled to the policy server, for performing admission control and network resource management.

14. The system of claim 13, wherein the policy server is further configured to manage relationships between application managers and the cable modem termination system device.

15. The system of claim 12, wherein the policy server is further configured to act as a policy decision point and as a policy enforcement point.

16. A memory including executable instructions which, when executed by a processor, provides an increased bandwidth to business subscribers by:
providing a plurality of bandwidth tier subscription plans having a plurality of increasing bandwidths, wherein a subscriber has a first bandwidth tier subscription plan having a first bandwidth;
determining whether the first bandwidth tier subscription plan is eligible for application of a business boost during business hours;
if the first bandwidth tier subscription plan is not eligible for application of the business boost during business hours, upgrading the subscriber to a second bandwidth tier subscription plan supporting the business boost and having a second bandwidth; and
if the subscriber is upgraded to the second bandwidth tier subscription plan supporting the business boost, activating business boost to the subscriber when the subscriber is eligible for the business boost during business hours and provisioning the increased bandwidth to the subscriber during business hours to provide the business boost to the subscriber,
wherein activating business boost comprises: loading MAC address of the eligible subscriber into a bandwidth-on-demand server prior to a start time, scheduling the increased bandwidth to the eligible subscriber having the MAC address continuously during business hours, deloading the MAC address of the eligible subscriber from the bandwidth-on-demand server at a stop time, and re-scheduling the eligible subscriber having the MAC address deloaded back to the second bandwidth.

17. The memory of claim 16, wherein activating business boost comprises setting the start time and the stop time for provisioning the increased bandwidth to the subscriber.

18. The memory of claim 17, wherein the setting the start time and the stop time further comprises setting the start time for the subscriber to receive the increased bandwidth at 7:00 a.m. and setting the stop time for the subscriber to revert back to contracted bandwidth at 7:00 p.m.

19. The memory of claim 16, wherein the provisioning the increased bandwidth to the subscriber during business hours comprises provisioning the subscriber with a first downstream/upstream profile having the first bandwidth with the business boost to provide a second downstream/upstream profile having the second bandwidth during business hours, wherein the second bandwidth is greater than the first bandwidth.

20. The memory of claim 16, wherein the provisioning the increased bandwidth further comprises applying the increased bandwidth to all business boost subscribers across all time zones where the elgible subscriber is located.

* * * * *